United States Patent [19]
Loustalet

[11] 3,738,693
[45] June 12, 1973

[54] APARATUS FOR SELECTIVE ENGAGEMENT AND DISENGAGEMENT BETWEEN A TRACTION MEANS AND A MECHANICAL UNIT

[75] Inventor: Pierre Loustalet, Tarbes, France

[73] Assignee: Etat Francais represente par le Ministre Charge de la Defense Nationale Delegation Ministerielle pour l'Armement, Paris, France

[22] Filed: June 16, 1971

[21] Appl. No.: 153,711

[30] Foreign Application Priority Data
June 17, 1970 France .............................. 7022291

[52] U.S. Cl. .......................... 287/119 R, 24/211 P
[51] Int. Cl. ............................................. F16b 7/00
[58] Field of Search ............ 287/119 R; 24/211 P, 24/230 AS; 294/90, 97, 95, 86.33; 285/320; 279/75, 77, 35

[56] References Cited
UNITED STATES PATENTS
2,499,712   3/1950   Armstrong .................... 24/211 P FOREIGN PATENTS OR APPLICATIONS
1,267,296   6/1961   France .............................. 294/95
1,416,836   9/1965   France .............................. 294/95

Primary Examiner—Andrew V. Kundrat
Attorney—Eric H. Waters, John G. Schwartz and J. Harold Nissen

[57] ABSTRACT

A locking head is secured to a traction means and permits coupling and uncoupling of the traction means to a guide housing secured to a mechanical unit. The locking head comprises a body provided with rotatable friction rolls automatically placed in locked position when the head is inserted into the housing, whereby the traction means and mechanical unit are engaged. The rolls can be rotated to unlocked position to permit disengagement by withdrawal of the locking head from the guide housing.

14 Claims, 10 Drawing Figures

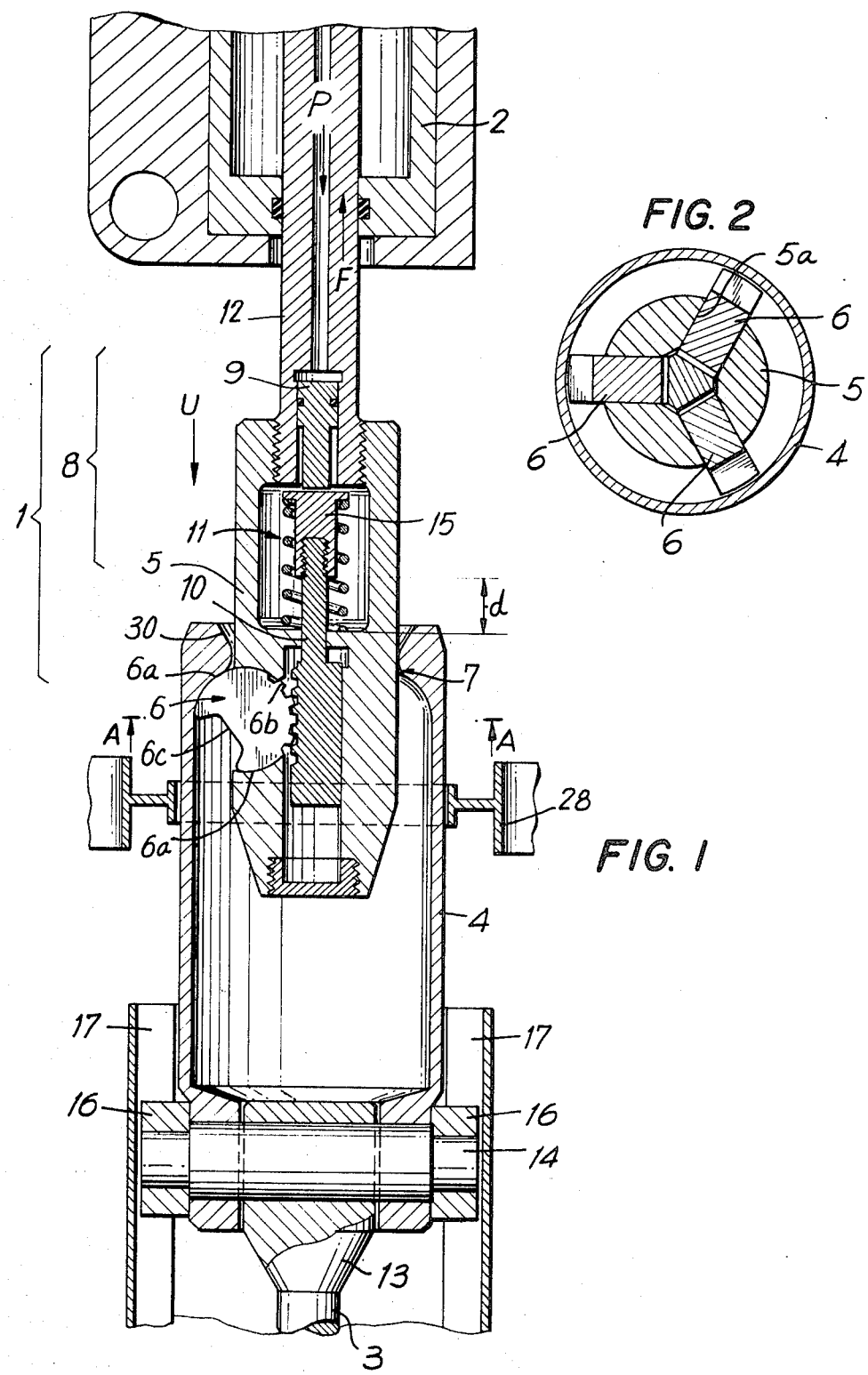

APARATUS FOR SELECTIVE ENGAGEMENT AND DISENGAGEMENT BETWEEN A TRACTION MEANS AND A MECHANICAL UNIT

BRIEF SUMMARY OF THE INVENTION

The invention relates to apparatus for selectively engaging and disengaging a traction means and mechanical unit.

More specifically the invention relates to a locking head which can be inserted into a guide housing and engaged therein to couple the traction means and mechanical unit, and which can be withdrawn from the guide housing to uncouple the traction means and mechanical unit.

An object of the invention is to provide a novel construction of such locking head which facilitates engagement and disengagement with the guide housing.

According to the invention, this objective is achieved by means of rotatable rolls mounted in recesses in the locking head and serving to selectively lock the head and the guide housing.

The locking head with rotatable rolls provides rapid and automatic coupling with the guide housing and controlled uncoupling therefrom. The locking head is particularly applicable to couplings required to transmit high tensile forces.

BRIEF DESCRIPTION OF THE DRAWING

FIG. 1 is a side elevational view of the apparatus according to the invention in engaged position, FIG. 2 is a section taken along line A—A in FIG. 1.

DETAILED DESCRIPTION

Figure 3:
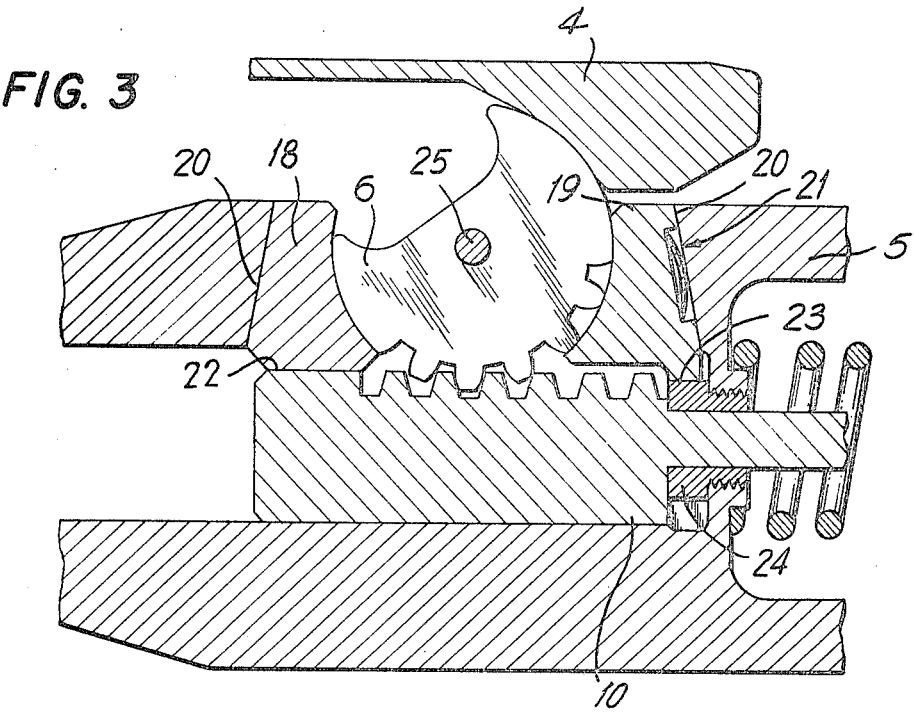
FIG. 3 is an enlarged sectional view of a portion of the locking head of the apparatus in engaged position.

FIG. 1 illustrates a locking head 1 which assures rapid and automatic coupling and controlled uncoupling of a traction means 2 and a mechanical unit 3. The traction means 2 can be either a hydraulic or pneumatic cylinder or jack or any other means allowing a force to be exerted in the direction of the arrow F, the mechanical unit being represented in FIG. 1 by a coupling bar.

Coupling is obtained by the entry of the locking head into a guide housing 4 and uncoupling is effected by withdrawing the locking head from the guide housing. This will be explained more fully later. In the illustrated embodiment, the locking head is secured with the traction means 2 and the guide housing is secured with the mechanical unit 3, but the reverse arrangement can be adopted without departing from the scope of the invention.

Figure 4:
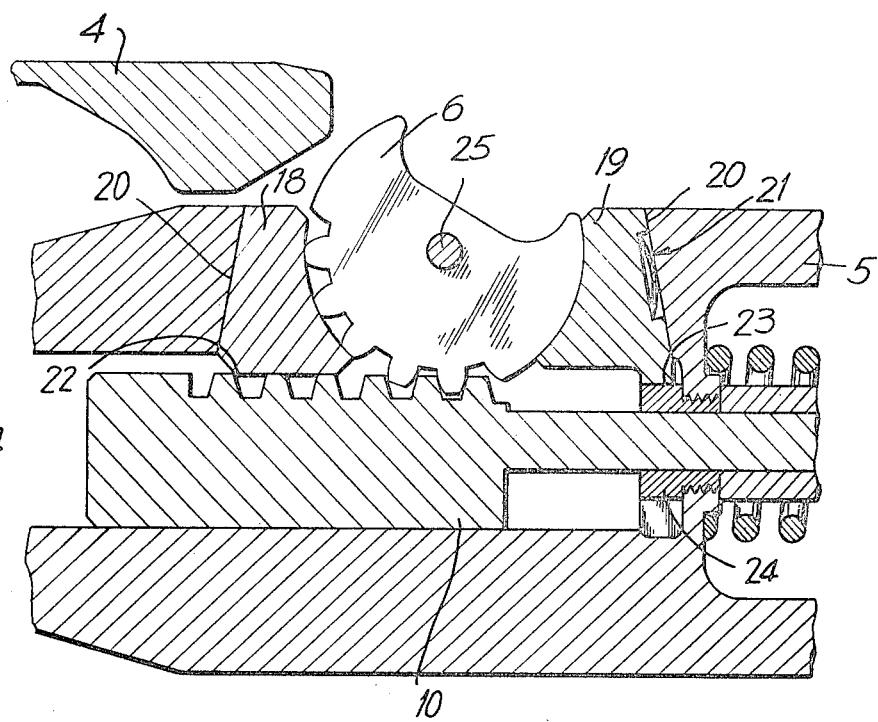
FIG. 4 shows the arrangement in FIG. 3 in disengaged position.

In its general conception, the locking head comprises:

a. a cylindrical body 5 having three circular recesses 5a;

b. three cylindrical rolls 6 whose peripheral surfaces comprise four distinct regions, namely: two opposite fulcrum surfaces 6a, a toothed segment 6b and a clearance 6c. The rolls 6 are rotatably fitted in the circular recesses of the body by resting with their peripheral surface against the walls of the recesses, and to assure engagement and disengagement of the head inside the guide housing 4 one of the ends of the guide housing 4 is provided with an internal shoulder 7 of toroidal shape whose function will be explained in greater detail later.

c. a roll driving arrangement 8 constituted by an auxiliary thrust means 9 supported on a rack 10 which is in mesh with the rolls 6 and is urged upwardly by a spring 11. Travel of the thrust means 9 in the direction of arrow U causes the rolls 6 to rotate and come into a disengaged position facilitating the uncoupling of the traction means 2 and mechanical unit 3. FIGS. 1 and 3 represent the assembly of rolls and driving system in engaged position. FIG. 4 shows the disengaged position.

The thrust means 9 is constituted as a piston and the fact that the piston is not fastened to rack 10 saves the rack from driving the piston while the locking head is entering the guide housing (see FIG. 6) and also permits imperfect alignment between the axis of the piston and the axis of the rack.

The spring 11 can be constituted as one or several helical spring members or it may be an accumulator containing a fluid or an elastomer under compression. The auxiliary thrust means 9 can be either a hydraulic or pneumatic single-acting piston or any other arrangement allowing a force to be exerted in the direction of arrow U greater than the force of the spring 11.

Figure 5:
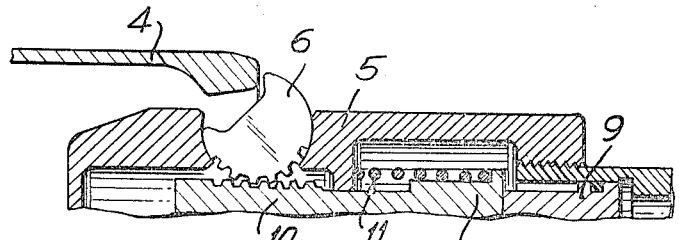
FIGS. 5-7 show in section the successive stages of engagement of the locking head and guide housing.
Figure 6:
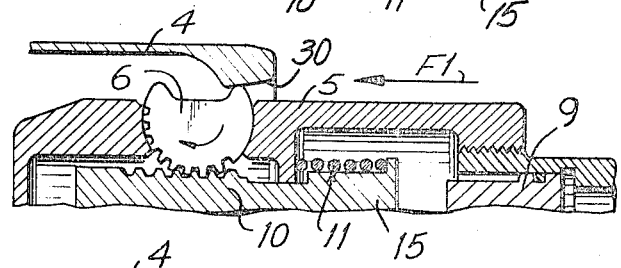
Figure 7:
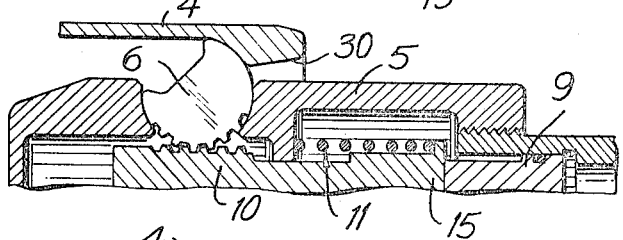

FIGS. 5-7 show the three stages of the coupling operation. This operation is effected by travel of the traction means and locking head in the direction $F_1$ in FIG. 6, the auxiliary thrust means 9 not coming into operation.

Figure 8:
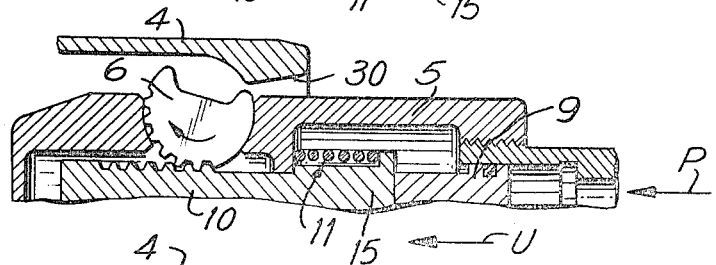
FIGS. 8-10 show in section the successive stages of disengagement of the locking head and guide housing.
Figure 9:
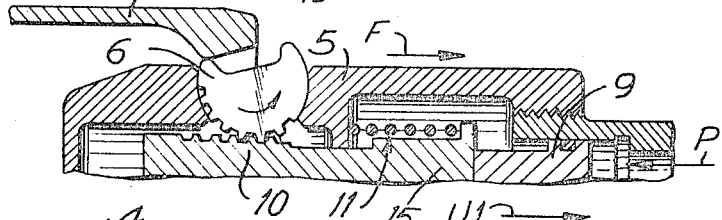
Figure 10:
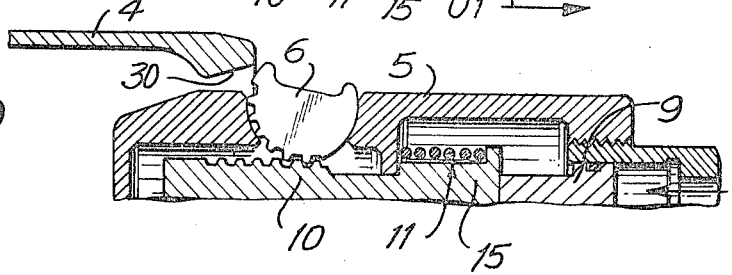

FIGS. 8-10 diagrammatically represent the three stages of uncoupling. This operation is achieved in two steps:

1. operation of the auxiliary thrust means 9 which causes the rolls 6 to rotate;

2. travel of the traction means and locking head in the direction F, the thrust of the auxiliary means 9 being maintained.

The locking head hereinafter described by way of example allows a tractive effort of 900 kN to be transmitted.

Locking head 1 is screwed onto stem 12 of the hydraulic cylinder 2. The guide housing 4 is attached to the stock 13 of the drawbar 3 by means of axle 14. Longitudinal guidance of the guide housing is assured by two slideblocks 16 in the rails 17 and a centering member 28.

The three friction rolls 6 are mounted in body 5 and are engaged with rack 10. FIG. 2 shows the angular arrangement of the rolls. Although three rolls have been shown, the device is operative with two rolls or more than three. At least two rolls are necessary.

Rack 10 is urged upwardly by the helical spring 11 which engages a ferrule 15 screwed onto the end of the rack. The stroke of the rack is determined by the distance d of FIG. 1.

The piston 9 slides in a cavity machined in stem 12 of cylinder 2 and pressure P is applied to the face of piston 9 through a bore in stem 12.

To facilitate machining, the recesses for each of the three friction rolls is constituted by two seat members 18 and 19 (FIGS. 3 or 4) of the same width as the rolls and which retain the rolls inside the body 5 by reason of:

a. the circular recess machined in each seat member sufficiently surrounds the roll so that the latter can not be ejected during the coupling or uncoupling operations;

b. each seat has a sloping fulcrum face 20, the fulcrum surfaces 20 of the two seat members being symmetrical relative to the roll so that the assembly of roll and seat members can be retained inside the body by a wedging effect;

c. all diametral play of the rolls inside their recesses is nullified by a Belleville type elastic washer 21 lodged between seat 19 and body 5;

d. each roll is loosely mounted on a pivot 25 integral with body 5 to complete the retaining action of the seat members and as a safety measure; a diametral clearance of the order of 0.5 mm is provided between the pivot and roll in order to avoid strain on the pivot by the forces exerted on the rolls.

Seat member 18 is provided with one face 22 acting as a fulcrum on the toothless end of the rack, when the locking head is in engaged position as shown in FIG. 3; seat member 19 is provided with a ridge 23 for anchoring on ferrule 24; thus when cylinder 2 exerts traction on guide housing 4, the reactive force furnished by the guide housing is communicated to the body 5 through the friction rolls engaged in the seat members, without any substantial stress being applied to the teeth of the rack.

The locking head described above can be applied in all cases where it is desired to assure frequent and absolutely safe automatic coupling and controlled uncoupling between a traction means and a mechanical unit, especially when the forces to be transmitted are high and the associated conditions severe. Nonrestrictive examples of constructions employing the invention are hoists, traction apparatus, etc.

In operation, to engage the cylinder 2 with the unit 3, the cylinder 2 is displaced towards unit 3 as shown by arrow $F_1$ in FIG. 6 and as the head 1 enters the guide housing 4, the fulcrum surfaces 6a of the rolls 6 engage cam surfaces 30 of the guide housing and the rolls are rotated clockwise to displace rack 10 away from piston 9 against the action of spring 11. When the rolls 6 have completely entered the guide housing 4, the compressed springs 11 can relax and displace the rack towards piston 9 to rotate the rolls to the position shown in FIG. 7 where they can seat against the internal shoulder 7 of the guide housing. The cylinder 2 and unit 3 are now engaged and lifting of cylinder 2 will carry unit 3 therewith.

To disengage the unit 3 from cylinder 2, the latter is pressurized to displace piston 9 which acts on rack 10, against the opposition of spring 11, causing the rolls 6 to be rotated clockwise as shown in FIG. 8. The cylinder 2 can now be displaced away from unit 3 in the direction of arrow $U_1$ in FIG. 9 as rolls 6 present clearances 6c to the cam surfaces 30 and freely travel therepast. If the fulcrum surfaces of the rolls should contact the cam surfaces 30 due to inexact positioning of the rolls, the latter can rotate to displace the rack and the piston therewith as seen in FIGS. 9 and 10, it being understood that relatively small pressures are necessary in cylinder 2 to separate the cylinder and unit 3. When the rolls have traveled out of the guide housing 4 the cylinder 2 and unit 3 are uncoupled and further retractive movement of cylinder 2 is unnecessary.

The locking head according to the invention offers the following advantages:

it can be applied in couplings that have to transmit high tensile forces, of the order of 1,000 kN for example;

it comes in the form of a simple, strong, shock-resisting assembly;

the coupling operation does not depend on the angular position of the mechanical unit relative to the traction means;

there is no flattening of the roll bearing surface;

the operation is easy in circumstances similar to those obtaining for public works devices;

the coupling and uncoupling operations can be achieved rapidly;

the strength required for coupling and uncoupling is low;

the machining of the constituent parts is simple.

What is claimed is:

1. Apparatus for selectively effecting automatic coupling and controlled uncoupling, said apparatus comprising a locking head, a guide housing having an opening with an internal shoulder into which said locking head can be inserted and then withdrawn, a plurality of rotatable rolls carried by said locking head, said rolls each having a peripheral surface of revolution with a local clearance, said head having recesses in which corresponding rolls are carried with their peripheral surfaces in slidable contact with the head, the rolls being rotatable in said recesses between first and second positions, said rolls being lockable in the first position in the guide housing with their peripheral surfaces in contact with the internal shoulder of the guide housing such that the locking head and guide housing are coupled, said rolls in the second position having their clearances facing the internal shoulder of the housing to enable the locking head to be inserted and removed from said guide housing and means carried by said head for engaging said rolls for rotating the rolls between said first and second positions, the said internal shoulder having a peripheral surface of revolution similar to that of said rolls and recesses and dimensioned to provide a substantially contiguous extension of said recesses when the head is in the housing.

2. An apparatus as claimed in claim 1 wherein said locking head comprises a cylindrical body, the peripheral surface of each roll having a portion which is cylindrical and which in said first position is in engagement with a corresponding cylindrical portion of the respective recess in said head.

3. Apparatus as claimed in claim 2 wherein said rolls each includes a toothed segment, said means for rotating the rolls comprising a displaceable rack in mesh with the toothed segments of the rolls.

4. Apparatus as claimed in claim 3 wherein said means for rotating the rolls further comprises a thrust means for displacing the rack, and elastic means acting on the rack to urge the same to a position in which the rolls are in said first position.

5. An apparatus as claimed in claim 4 wherein said internal shoulder of the guide housing has a toroidal bearing surface for support of the rolls when these are in the first position.

6. Apparatus as claimed in claim 5 wherein said guide housing has an internal cylindrical shoulder for seating of the rolls thereagainst when the latter are in said first position.

7. Apparatus as claimed in claim 6 wherein said cylindrical body includes two seat members symmetrically arranged in a bore in said body to define each cylindrical recess, said seat members being constructed to transmit force from said body to said rolls and to said housing independently of the teeth of the rack.

8. Apparatus as claimed in claim 7 wherein said seat members are cylindrical and surround each roll sufficiently for the latter not be ejected from the body.

9. Apparatus as claimed in claim 8 wherein said seat members have external inclined surfaces which are symmetrical relative to that axis of the roll which is perpendicular to the axis of the rack, such that the assembly of roll and seat members is secured inside the body of the locking head by a wedging effect.

10. Apparatus as claimed in claim 9 wherein each seat member has a surface which is engaged with said rack along an untoothed portion thereof.

11. Apparatus as claimed in claim 6 wherein said thrust means comprises a single-acting hydraulic jack including a piston which acts on said rack.

12. Apparatus as claimed in claim 11 wherein said single-acting hydraulic jack is housed in the traction means.

13. Apparatus as claimed in claim 12 wherein said body includes a pivot for each roll, each roll being mounted on a respective pivot with substantial diametral clearance.

14. Apparatus as claimed in claim 10 comprising an elastic washer interposed between one of the two seat members of each roll and said body to urge the cylindrical surface of the roll into contact with the seat members.

* * * * *